(12) United States Patent
Yentür et al.

(10) Patent No.: US 9,495,097 B2
(45) Date of Patent: Nov. 15, 2016

(54) TOUCH-SENSITIVE ELECTRIC APPARATUS AND WINDOW OPERATION METHOD THEREOF

(71) Applicant: Pitcher AG, Zürich (CH)

(72) Inventors: Mert Yentür, Zürich (CH); Alexandra Sabelnikova, Zürich (CH)

(73) Assignee: PITCHER AG, Zurich (CH)

( * ) Notice: Subject to any disclaimer, the term of this patent is extended or adjusted under 35 U.S.C. 154(b) by 144 days.

(21) Appl. No.: 14/075,091

(22) Filed: Nov. 8, 2013

(65) Prior Publication Data

US 2014/0137035 A1    May 15, 2014

Related U.S. Application Data

(63) Continuation-in-part of application No. 13/672,929, filed on Nov. 9, 2012, now abandoned.

(51) Int. Cl.
*G06F 3/048* (2013.01)
*G06F 3/0488* (2013.01)

(52) U.S. Cl.
CPC . *G06F 3/04883* (2013.01); *G06F 2203/04804* (2013.01)

(58) Field of Classification Search
CPC .............. G06F 2221/0711; G06F 2221/0715; G06F 2221/072; G06F 19/322; G06F 12/0269; G06F 3/0481; G06F 9/445
See application file for complete search history.

(56) References Cited

U.S. PATENT DOCUMENTS

| | | | | |
|---|---|---|---|---|
| 6,236,990 | B1 * | 5/2001 | Geller | G06Q 30/04 |
| 2004/0113934 | A1 * | 6/2004 | Kleinman | G06F 17/30056 715/732 |
| 2011/0102464 | A1 * | 5/2011 | Godavari | G06F 3/0416 345/650 |
| 2011/0239156 | A1 * | 9/2011 | Lin | G06F 3/04883 715/788 |

FOREIGN PATENT DOCUMENTS

| | | |
|---|---|---|
| EP | 2372513 A2 | 10/2011 |
| WO | 2011056387 A1 | 5/2011 |

* cited by examiner

*Primary Examiner* — William Bashore
*Assistant Examiner* — Rayeez Chowdhury
(74) *Attorney, Agent, or Firm* — Browdy and Neimark, PLLC

(57) ABSTRACT

A window operation method for use in an electronic device comprises a touch-sensitive screen, a storage unit with pointers to slides of a graphical presentation being stored in a database and a processing module. The method applies the steps of storing a touch-control database comprising at least two touch-control events and an assessment field in the storage unit for each pointer to a slide, generating and displaying a slide of the graphical representation and a transparent window, analyzing a touch-control command received via the touch-sensitive screen and determining whether the touch-control command conforms to one of the stored touch-control event, an assessment value is stored in the assessment field in the storage unit for the current pointer to a slide, said assessment value corresponding to an emotional feedback of a user regarding said slide.

6 Claims, 3 Drawing Sheets ic # TOUCH-SENSITIVE ELECTRIC APPARATUS AND WINDOW OPERATION METHOD THEREOF

TECHNICAL FIELD

The present invention relates to a touch-sensitive electric apparatus and window operation method, for use in an electronic device comprising a touch-sensitive screen, a storage unit and a processing module, wherein pointers to slides of a graphical presentation are stored in a database within the storage unit.

PRIOR ART

A method for gesture control in relation with touch sensitive screens is known from EP 2 372 513, providing transparent windows adapted to be manipulated when other windows are also displayed on the sensitive screen.

WO 2011/056387 provides a multi-touch control which uses a function similar to a double touch opening of menus as known in connection with the use of context menus and computer mice in use with conventional screens.

When a presentation is given with the use of slides shown on a computer screen it is often a need for the person giving the representation to make notes relating to the reaction of the target audience on the presentation of slides. For the time being, there is no technical means to provide an easy solution for supporting the user, so that he is forced to memorize the reactions. This is especially true, when a face-to-face situation exists where a tablet computer with a touch-sensitive screen is used.

SUMMARY OF THE INVENTION

Based on this prior art it is therefore an object of the invention to provide a method and a device attending to this deficit. It is also an aim to provide directly a possibility for storing such feedback information for easy later retrieval. Furthermore it is contemplated to improve the knowledge of use of different presentation materials as slides or pages of an electronic book, e.g. a PDF document.

The invention is based on the inside, that modern tablet computers having a touchscreen interface enable a user of the touchscreen can directly combine giving a notation of a slide being presented together with the normal use of the presentation tools.

It is disclosed a window operation method for use in an electronic device comprising a touch-sensitive screen, a storage unit and a processing module. Within the storage unit, a database is provided wherein pointers to slides of a graphical presentation are stored. The method then comprises the steps of: storing a touch-control database comprising at least two touch-control events and an assessment field in the storage unit for each pointer to a slide, generating a slide of the graphical representation and a transparent window, displaying the slide of the graphical representation and the transparent window on top of it on the touch-sensitive screen by the processing module, wherein the transparent window comprises said touch-control events, analyzing a touch-control command received via the touch-sensitive screen by the processing module, and finally determining whether the touch-control command conforms to one of the stored touch-control events, wherein, when the touch-control command conforms to one of the stored touch-control events, an assessment figure is stored in the assessment field in the storage unit for the current pointer to a slide.

In a specific embodiment any of the touch-control events is also adapted to trigger, after execution of the step of generating and storing an assessment figure, the generation of the next slide of the graphical representation.

It is a further possibility, when the touch-control command is given over an extended period of time, that the transparent window turns visible and shows and displays the fields relating to the at least two touch control events.

The storage unit can also comprise a time field, within which upon going to the next slide, the time of representation of the given slide is stored.

In a further embodiment, the storage of a touch-control event is performed in such a way that, in the case of multiple subsequent activations of a touch-control event, only the touch-control event is stored which is received the last in respect of time.

The touch-control events may comprise gestures replacing specific assessment fields or these gestures replacing specific assessment fields or these gestures are additionally added to specific assessment fields. Especially it is possible that a specific touch-control event is activated when the user, with a finger of his hand, swipes from right-to-left or from left-to-right over the screen. The height of the swipe, being the touch-control command, is considered to conform to one of the stored touch-control events, and determines the value of the assessment figure to be stored in the assessment field in the storage unit for the current pointer to a slide.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
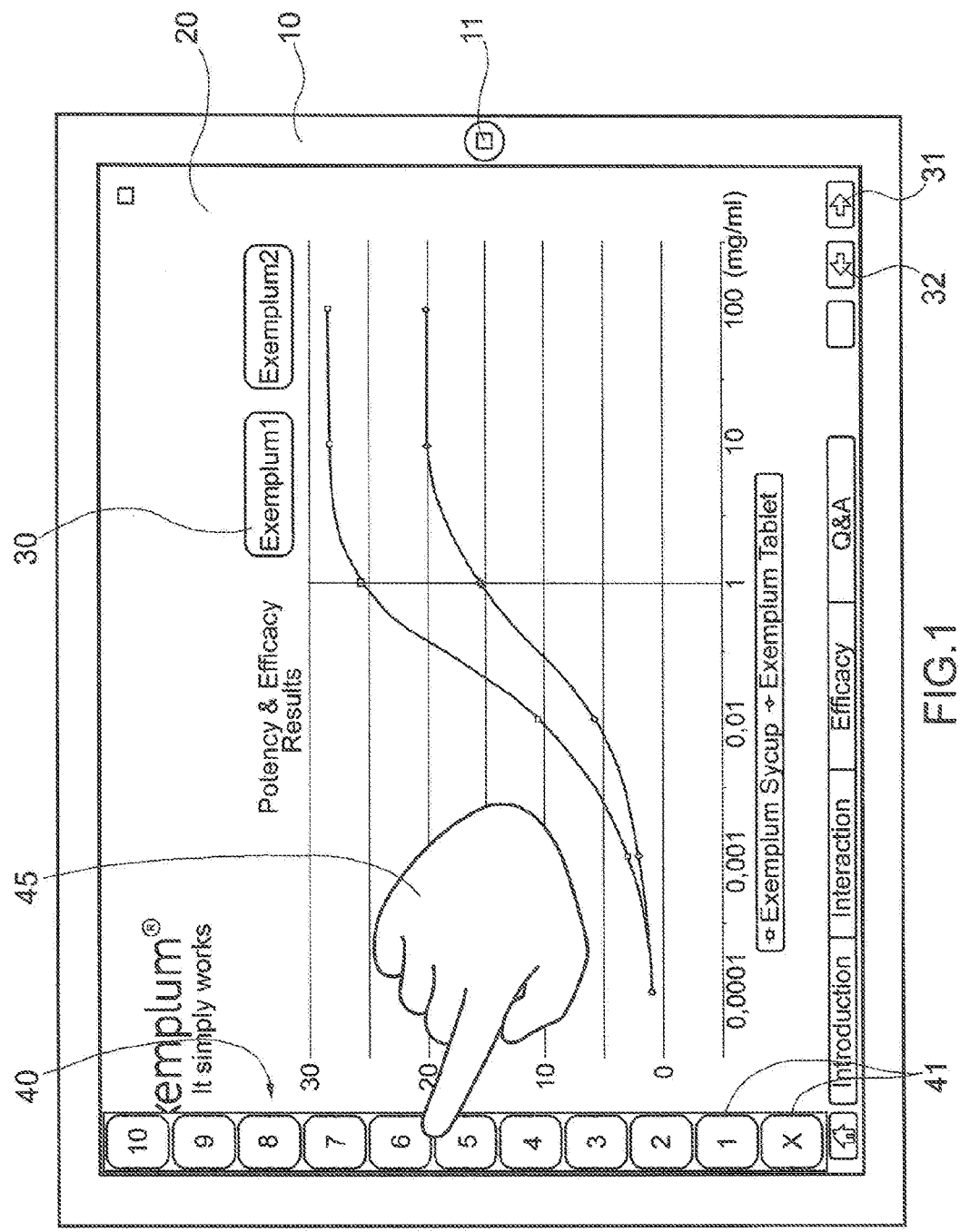
FIG. 1 shows a representation of an electronic device as a tablet computer providing a slide representation executing a method according to the invention.
Figure 2:
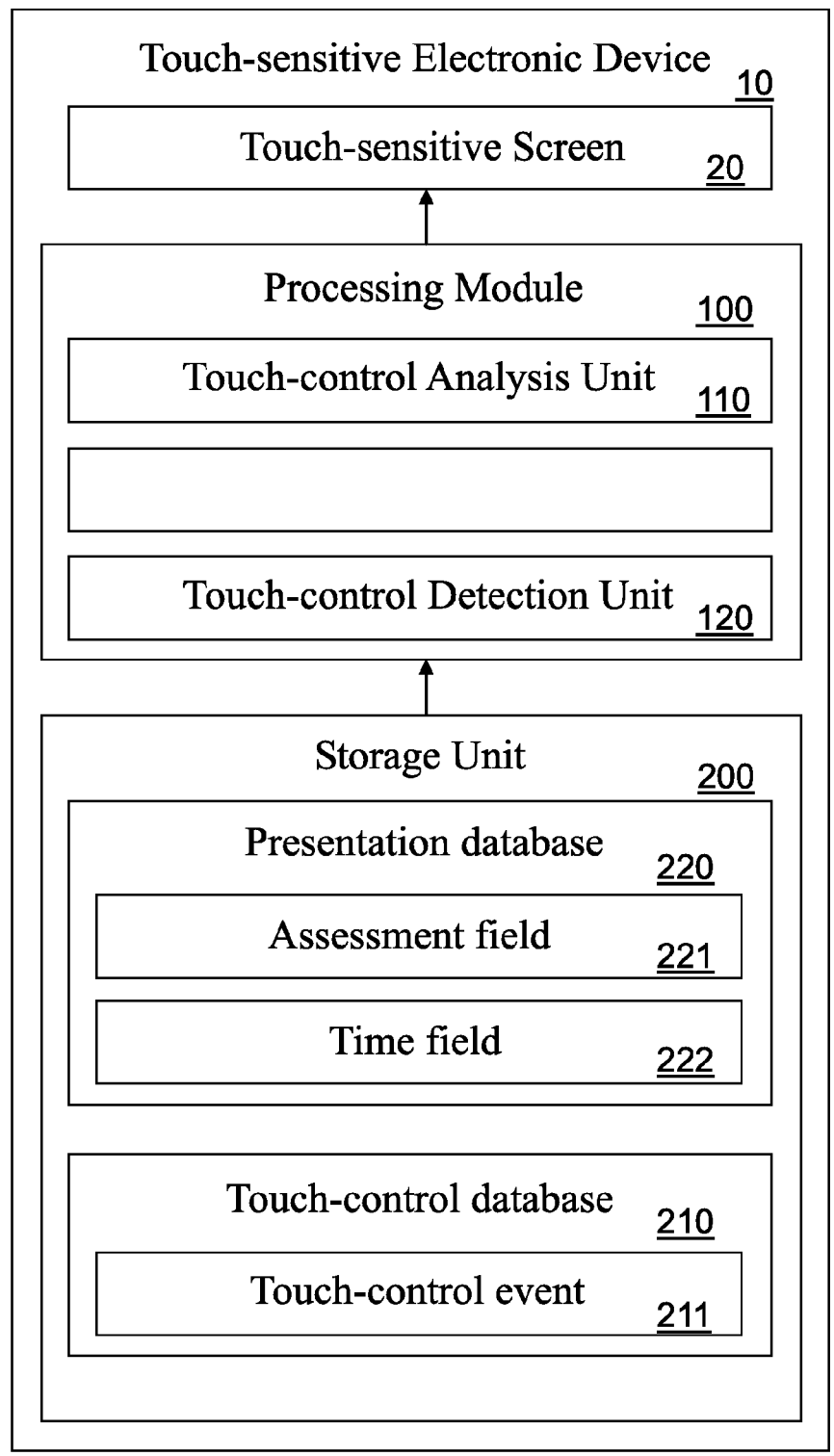
FIG. 2 shows a block diagram illustrating an embodiment of the electronic device according to the invention.

A touch sensitive electric device 10 as a representation device is represented in form of a tablet computer in FIG. 1. Such a device usually comprises an on-off-switch 11 and a central touch sensitive display and screen 20. FIG. 2 now shows a block diagram of the main electronic parts of the device 10 which are relevant for the invention. Of course, device 10 also comprises a battery, one or more interfaces (WLAN, 3G etc.) and further modules which are necessary for the use of the device but not relevant in view of features according to the invention.

Within the touch sensitive electronic device 10 is provided a storage unit 200 comprising a presentation database 220 and a touch-control database 210. The database 220 comprises e.g. the graphical presentation which could be provided according to the requirements of the operating system. For the WINDOWS operating system a popular software program is PowerPoint, for Android it is e.g.

contained in an application called Polaris and for the Mac-system Keynote can be mentioned.

Furthermore, a touch-control database 210 is provided within the storage unit 200 comprising a number of touch-control events 211. In other words, the Figures relate to certain aspects of a window operation method for use in the electronic device 10 comprising the touch-sensitive screen 20, the storage unit 200 and e.g. a processing module 100, wherein pointers to slides of a graphical presentation are stored in the database within the storage unit 200. At least two touch-control events are stored per presentation slide, in other words for every entry in the presentation database 220 at least two fields are provided in the touch-control database 210. The relevant pointer shows to the assessment field 221 within the presentation database 220, the relevant pointer being a particular pointer stored in the touch-control database 210 that points to the particular assessment field 221 stored within the presentation database 220.

Of course it is possible to create one single database comprising the touch-control events 211 and the assessment field 221 which can also be separately provided from the presentation slides.

Within the method according to the invention, a slide of the graphical representation is generated for representation on the screen 20 as well as a transparent window 40 which is provided as a rectangular frame on the left hand side of the screen 20. Of course it would also be possible to provide such a frame along a different side of the screen. It is preferable and an advantage, if the transparent window 40 is provided between the entire boundaries of the screen so that a user, here represented by his hand 45 can directly know where he has to touch to achieve a specific result. Although the window 40 could be visible as in the representation of FIG. 1 to demonstrate the function, it should usually be invisible for the user.

The transparent window 40 is divided into a number of touch-control events 211 here in eleven fields 41. These fields are marked in the representation of FIG. 1 from X and 1 to 10.

It is also possible to have a different number of elements 41, i.e. only two, one on the lower left hand side of the window and one of the upper side of the window; or any other number.

As soon as the user with his hand 45 touches the transparent window region 40 a specific touch-control event 211 as field 41 is chosen. Then this information is used by the processing module 100 within a touch-control detection unit 120 to assert which touch-control event 211 was triggered and that touch-control event is attributed within the touch-control analysis unit 110 to a specific assessment value which is stored in the assessment field 221 relating to the presentation database 220. In other words, in the present example as shown in FIG. 1 a value "6" is stored. The window 40 usually is invisible and does not hinder the representation of elements 30. It is possible to make the window visible over the entire time or only during a moment, when a specific field is touched. The value attributed to the assessment field 221 can be e.g. the impression that the presenter of the slide has when he sees the reaction of the public. In this respect it is possible to touch several times the window 40 before going to the next slide through the cursor 31 or to another slide via another element on the touchscreen as e.g the backward arrow 32. Only the last touched assessment value is stored in field 221. Therefore, the user can correct his initial assessment of the slide until representation of this slide is finished.

It is also possible that the touch of the touch-control event 211 in the field 40 also triggers the forward button to go into the next slide so that only one and final assessment can be given with the advantage that it cannot be forgotten, because this could be the only way to go forward in the slides.

Besides the assessment field 221 it is possible that a field like the window field "X" 41 is used to mark a special event so that afterwards the database having values for the impression of the slides can be augmented with the specific written description which is claimed from the presenter if any slides have received the mark X. Then using the touch event 211 for such a mark X would trigger a flagging of the field in question.

The window 40 of FIG. 1 covers 10% of the screen 20 and is divided from bottom to top into eleven distinct equal areas, which can be called hotspots.

During a discussion, the presenter of the slides can click on any of these hotspots and thereby directly give an emotional feedback to the particular page or slide. The particular page or slide can thereby be generated based on an above-mentioned popular representation software program or can also be a simple aggregation of pages such as a PDF or a multi-page Tiff.

Additionally, the presentation database can comprise a time field 222 which is filled with the cumulative time values the user stayed on a specific slide or page. This value is separately recorded and gives together with the assessment value a tool to analyze the impression and feedback of slides. If e.g. some of the slides are—over a number of representations—not shown at all or only for a very short time, then the question arises, if it is necessary to include them in the presentation. On the other side, if a slide has a very long representation time and a bad value, then this slide has to be improved. However, these functions are stemming from the technical solution to provide and fill an assessment field value 221 and optional a time field 222 being filled, when specific touch-control event fields 211 are activated during a representation.

Figure 3:
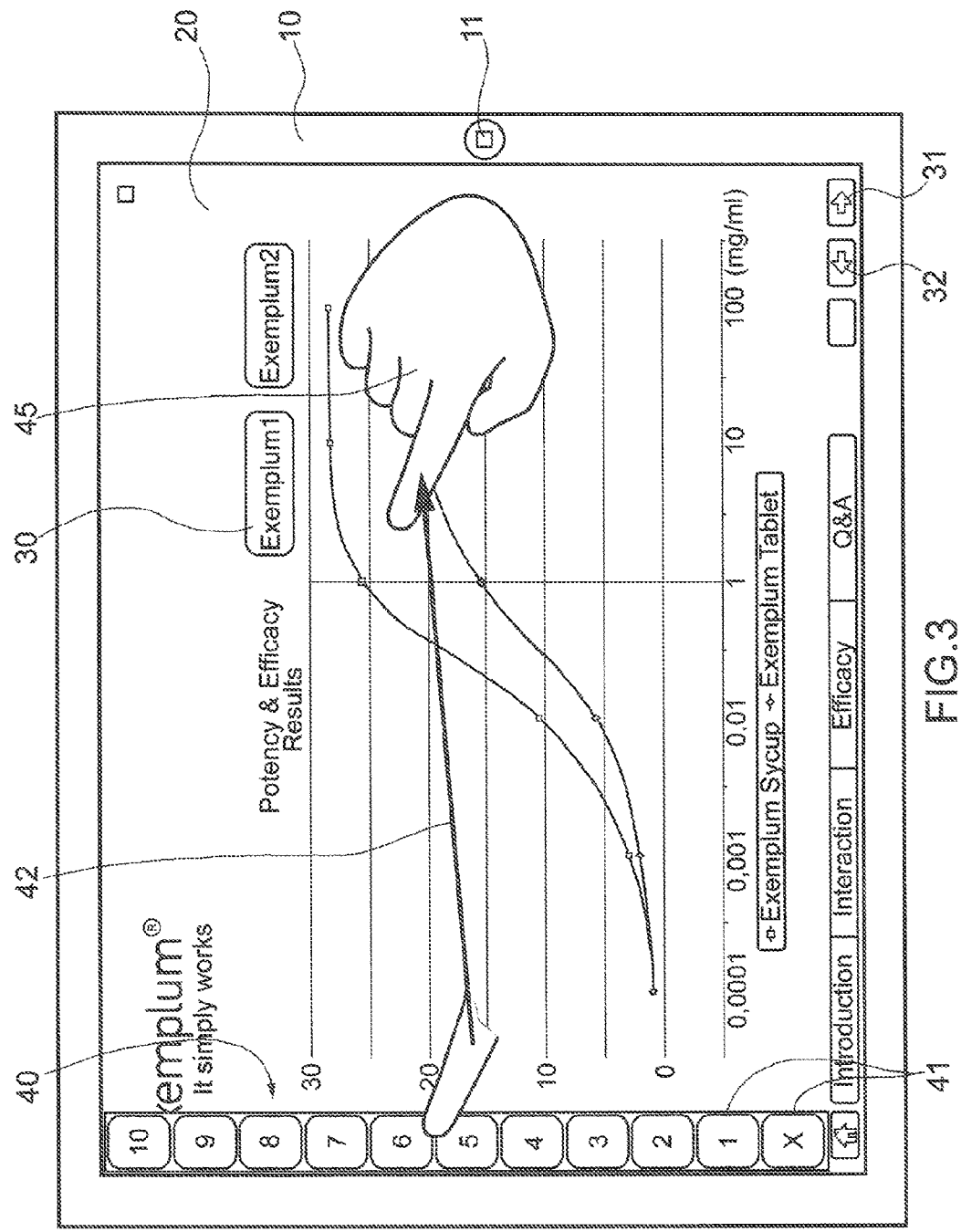
FIG. 3 shows a representation of the electronic device of FIG. 1 executing a different touch control event according to the invention.

FIG. 3 shows a representation of the electronic device of FIG. 1 executing a further touch control event according to the invention. As mentioned above, the touch-control events may comprise gestures replacing specific fields 40 or they are provided in addition to them. FIG. 3 shows a sweeping action 42 as touch control event. In this specific embodiment the touch-control event is activated when the user, with a finger of his hand, swipes from left-to-right according to arrow 42 over the screen. The original starting position of a finger and a possible final position of the hand 45 is shown in FIG. 3.

The swipe is roughly at the same height. In order to determine an assessment figure, the screen is now segmented into a number of horizontal stripes, as prolongation of the fields X and 1 to 10 from the touch control events 41 from FIG. 1. They are not shown as bands in FIG. 3. When compared to the numeral fields of touch-control events 41 the assessment value which is to be attributed to the sweeping action would be "6". It could be determined as the starting position height of the finger (here at the lower band of assessment figure "6") or as the end position of the finger (here within the band of the stripe with the value "6") or as an average value. It is also possible that the swipe does not necessarily goes from the left edge to the right edge (or vice-versa). It is also possible that a specific minimum swipe as e.g. 30% or 50% or 70% of the width of the table screen 20 is sufficient for triggering the touch control event through the gesture. Then, the height of the swipe, being the touch-control command, is considered to conform to one of the stored touch-control events and determines the value of the assessment figure to be stored in the assessment field in the storage unit for the current pointer to a slide. It can be predetermined that a swipe from left-to-right only determines and stores the assessment value whereas the swipe from right-to-left also triggers the generation of the next slide according to the method.

It is also possible that the gesture itself determines the assessment figure. In such a case the gesture is read as a figure through intelligent character recognition (ICR).

| LIST OF REFERENCE SIGNS | |
|---|---|
| 10 | electronic device |
| 11 | on-off switch |
| 20 | display and touch-screen |
| 30 | slide |
| 31 | forward touch-control event |
| 32 | backward touch.control event |
| 40 | transparent window |
| 41 | touch control event |
| 42 | touch control swipe event |
| 45 | hand of a user |
| 100 | processing module |
| 200 | storage unit |
| 210 | touch-control database |
| 211 | touch-control event |
| 220 | presentation database |
| 221 | assessment field |
| 222 | time field |

The invention claimed is:

1. A window operation method, for use in an electronic device comprising a touch-sensitive screen, a storage unit and a processing module, wherein pointers to slides of a graphical presentation are stored in a database within the storage unit, wherein the storage unit also comprises a time field associated with each slide, and wherein the method comprises the steps of:
   a) storing a touch-control database comprising at least two touch-control events and an assessment field in the storage unit for each pointer to a slide,
   b) generating a slide of the graphical presentation and a transparent window,
   c) displaying the slide of the graphical presentation and the transparent window on top of the displayed slide on the touch-sensitive screen by the processing module, wherein the transparent window comprises said touch-control events,
   d) analyzing a touch-control command received via the touch-sensitive screen by the processing module,
   e) determining whether the touch-control command conforms to one of the stored touch-control events,
   f) upon reception of a control command to leave the representation of the slide, storing, in the time field associated with said slide, the user-controlled viewing time that said representation of the slide was presented during the graphical presentation; and
   g) returning to step b) for the generation of the next slide or to end the presentation,
   wherein, when the touch-control command conforms to one of the stored touch-control events, an assessment value is stored in the assessment field in the storage unit for the current pointer to a slide, said stored assessment value corresponding to an emotional feedback of a user regarding said slide.

2. The method according to claim 1, wherein, when the touch-control command is given over an extended period of time, that then the transparent window turns visible and shows and displays the assessment field relating to the at least two touch control events.

3. The method according to claim 1, wherein in the case of multiple subsequent activations of a touch-control event, only that touch-control event being stored which is received the last in respect of time.

4. The method according to claim 1, wherein the touch-control events comprise gestures replacing a specific assessment field or these gestures are additionally added to the specific assessment field.

5. The method according to claim 4, wherein the gesture of the touch control event is attributed an assessment value based on the gesture.

6. A touch-sensitive electronic device, comprising:
   a storage unit storing a touch-control database comprising at least two touch-control events, a sequence of slides of a graphical presentation and a time field associated with each of the sequence of slides;
   a touch-sensitive screen receiving a touch-control command or gesture, wherein the touch-sensitive screen is configured and operable to display the sequence of slides; and
   a processing module electrically coupled to the storage unit and the touch-sensitive screen, configured and operable to:
   analyze the touch-control command or gesture to determine whether the touch-control command or gesture conforms to any one of the touch-control events,
   when the touch-control command or gesture conforms to one of the touch-control events, store an assessment value in the assessment field in the storage unit for the current pointer to a slide, said stored assessment value corresponding to an emotional feedback of a user regarding said slide, and
   upon reception of a control command to leave the slide, storing, in the time field associated the slide, the user-controlled viewing time that the slide was presented during the graphical presentation.

* * * * *